US011456465B2

(12) United States Patent
Haase

(10) Patent No.: US 11,456,465 B2
(45) Date of Patent: Sep. 27, 2022

(54) METHOD FOR PRODUCING A BIPOLAR PLATE

(71) Applicant: Bayerische Motoren Werke Aktiengesellschaft, Munich (DE)

(72) Inventor: Stefan Haase, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/009,537

(22) Filed: Jun. 15, 2018

(65) Prior Publication Data

US 2018/0294488 A1 Oct. 11, 2018

Related U.S. Application Data

(63) Continuation of application No. PCT/EP2016/078024, filed on Nov. 17, 2016.

(30) Foreign Application Priority Data

Dec. 17, 2015 (DE) ..................... 10 2015 225 536.0

(51) Int. Cl.
*H01M 8/0228* (2016.01)
*H01M 8/0206* (2016.01)
(Continued)

(52) U.S. Cl.
CPC ........... *H01M 8/0228* (2013.01); *B60L 50/72* (2019.02); *H01M 8/0202* (2013.01);
(Continued)

(58) Field of Classification Search
CPC ....... B06L 50/72; H01M 2/145; H01M 8/202; H01M 8/206; H01M 8/228; H01M 8/247; H01M 8/2465
See application file for complete search history.

(56) References Cited

U.S. PATENT DOCUMENTS

2007/0231619 A1* 10/2007 Strobel ................... C25B 9/203
429/457
2011/0262829 A1* 10/2011 Fly ...................... H01M 8/0247
429/468

(Continued)

FOREIGN PATENT DOCUMENTS

CN 201664944 U 12/2010
CN 103178276 A 6/2013
(Continued)

OTHER PUBLICATIONS

English translation of DE102013206789, listed in the IDS filed Jun. 15, 2018 (Year: 2013).*

(Continued)

*Primary Examiner* — Sarah A. Slifka
*Assistant Examiner* — Rachel L Zhang
(74) *Attorney, Agent, or Firm* — Crowell & Moring LLP

(57) ABSTRACT

A method for producing a bipolar plate for a fuel cell stack includes the following steps: providing two half-plates made of sheet metal, which form the bipolar plate when arranged on top of one another, wherein the half-plates are profiled via deformation of the sheet metal, and wherein, as a result of the profiling, the two half-plates arranged on top of one another contact at at least one contact region and do not contact at at least one non-contact region; carrying out at least one first cut in the non-contact region of at least one half-plate, before the half-plates are arranged on top of one another; Arranging the two half-plates on top of one another and connecting same; and carrying out at least a second cut in the contact region through both half-plates after they have been arranged on top of one another and connected.

10 Claims, 2 Drawing Sheets

(51) Int. Cl.
  *H01M 8/2465* (2016.01)
  *H01M 8/0202* (2016.01)
  *H01M 8/0247* (2016.01)
  *B60L 50/72* (2019.01)
  *H01M 50/403* (2021.01)

(52) U.S. Cl.
  CPC ....... *H01M 8/0206* (2013.01); *H01M 8/0247* (2013.01); *H01M 8/2465* (2013.01); *H01M 50/403* (2021.01)

(56) References Cited

U.S. PATENT DOCUMENTS

| | | | |
|---|---|---|---|
| 2011/0269048 A1* | 11/2011 | Reinert | H01M 8/0265 429/452 |
| 2015/0111125 A1 | 4/2015 | Farrington | |
| 2015/0180061 A1* | 6/2015 | Wuillemin | H01M 8/2425 429/434 |
| 2015/0333357 A1 | 11/2015 | Hashimoto et al. | |
| 2016/0308223 A1* | 10/2016 | Jones | H01M 8/0258 |

FOREIGN PATENT DOCUMENTS

| | | |
|---|---|---|
| CN | 103229332 A | 7/2013 |
| DE | 10 2006 038 173 A1 | 12/2007 |
| DE | 10 2006 041 296 A1 | 3/2008 |
| DE | 10 2004 058 117 B4 | 1/2009 |
| DE | 10 2008 018 595 A1 | 10/2009 |
| DE | 10 2009 059 767 A1 | 6/2011 |
| DE | 10 2013 206 789 A1 | 10/2013 |
| DE | 10 2014 015 219 A1 | 4/2015 |
| EP | 2 608 299 A1 | 6/2013 |
| JP | 61-279068 A | 12/1986 |
| JP | 63-58769 A | 3/1988 |
| JP | 2009-4158 A | 1/2009 |
| JP | 2009-48775 A | 3/2009 |
| JP | 2009-252581 A | 10/2009 |
| JP | 2012-227019 A | 11/2012 |
| JP | 2016-48620 A | 4/2016 |
| WO | WO 2014/013747 A1 | 1/2014 |

OTHER PUBLICATIONS

Japanese-language Office Action issued in counterpart Japanese Application No. 2018-528269 dated Nov. 5, 2018 with unverified English translation (nine pages).
International Search Report (PCT/ISA/210) issued in PCT Application No. PCT/EP2016/078024 dated Dec. 23, 2016 with English translation (five pages).
German-language Written Opinion (PCT/ISA/237) issued in PCT Application No. PCT/EP2016/078024 dated Dec. 23, 2016 (six pages).
German-language Search Report issued in counterpart German Application No. 10 2015 225 536.0 dated Oct. 5, 2016 with partial English translation (10 pages).
Chinese Office Action issued in Chinese application No. 201680069529.6 dated Apr. 22, 2020, with English translation (Sixteen (16) pages).
Chinese Office Action issued in Chinese application No. 201680069529.6 dated Sep. 9, 2020, with English translation (Sixteen (16) pages).
Chinese Office Action issued in Chinese application No. 201680069529.6 dated Feb. 26, 2021, with English translation (Ten (10) pages).

\* cited by examiner

METHOD FOR PRODUCING A BIPOLAR PLATE

CROSS REFERENCE TO RELATED APPLICATIONS

This application is a continuation of PCT International Application No. PCT/EP2016/078024, filed Nov. 17, 2016, which claims priority under 35 U.S.C. § 119 from German Patent Application No. 10 2015 225 536.0, filed Dec. 17, 2015, the entire disclosures of which are herein expressly incorporated by reference.

BACKGROUND AND SUMMARY OF THE INVENTION

The present invention relates to a method for producing a bipolar plate for a fuel cell stack. Furthermore, the invention relates to the fuel cell stack having the bipolar plates produced according to the invention and to a vehicle in which the fuel cell stack is used.

It is customary for a plurality of bipolar plates to be stacked on top of one another in a fuel cell stack. The two outer sides of the individual bipolar plate form the anode side and cathode side of the fuel cell. Bipolar plates considered here are composed of two half-plates. The half-plates are each components cut from sheet metal. The two half-plates are profiled by forming, i.e. they are not planar metal sheets, but rather three-dimensional components with elevations and depressions. The profiling in the two outer sides of the bipolar plate is used for distributing the reactants, for example hydrogen and air. Furthermore, cavities between the two half-plates can result through the profiling. These cavities can remain unused or can be used, for example, as channels for a cooling medium and thus for cooling the bipolar plate.

The individual half-plates have to be cut out of the sheet metal at their outer periphery. Furthermore, so-called ports have to be cut into the bipolar plates. When stacking the plurality of bipolar plates to form a fuel cell stack, the ports are aligned and thus form ducts which extend over all bipolar plates. The reactants and, where appropriate, cooling media are distributed to the individual bipolar plates via these ducts or ports.

In the prior art, the cutting of the individual half-plate or of the bipolar plate occurs either by way of mechanical cutting or thermal cutting. In the context of this invention, the umbrella term "cutting" is used for both mechanical cutting and thermal cutting.

A disadvantage with mechanical cutting is that it can result in a deformation of the profiled half-plates. Therefore, thermal cutting, in particular laser cutting, is usually resorted to. However, a disadvantage with laser cutting is that the laser can be focused only onto one point. Outside of the focus, there occurs increased burr formation.

The two half-plates are customarily placed onto one another and welded. During welding, a sufficient area must be present, in particular close to the weld seams, in order to press the two half-plates against one another or to hold down one of the half-plates. If, however, the half-plates are already completely cut to size, there is no longer present a sufficient area for pressing or holding down, in particular in the region of certain weld seams.

It is an object of the present invention to provide a method for producing a bipolar plate which allows an efficient, in particular quick, material-saving and reliable production.

This and other objects are achieved by a method for producing a bipolar plate for a fuel cell stack. The method comprises the following steps:

(i) first of all, there are provided two half-plates made of sheet metal. The sheet metal is in particular composed of any desired metal. In particular, there is provision that the method according to the invention comprises not only the provision of the half-plates but also the cutting of the half-plate from the sheet metal and/or the forming of the sheet metal to produce the profiling.

The two half-plates are designed in such a way that they result in the bipolar plate in a state in which they are placed on top of one another. The two half-plates are profiled. The profiling of the half-plate is produced by forming the sheet metal. The term "profiling" means that the half-plates are not planar metal sheets, but rather three-dimensional components with elevations and depressions.

In the finished state, that is to say when the two half-plates lie on one another so as to correspond to the desired bipolar plate, there is at least one so-called contact region and one noncontact region of the bipolar plate. At the contact region, the two half-plates lie directly on top of one another and make contact with one another. At the noncontact region, a cavity remains between the two half-plates. This cavity within the bipolar plate can remain unused or can be used for example for channeling through a medium.

(ii) In the course of the method described here for producing the bipolar plate, a cutting of the half-plates must occur. This "cutting" comprises in particular:

a cutting of the individual half-plate out of the sheet metal, and/or a subsequent cutting to size of the half-plate, for example at the edges of the half-plate, and/or a cutting-out of material to form a port, and/or a cutting of the finished bipolar plate after the two half-plates have been connected, and/or a cutting-out of throughflow regions through one of the two half-plates.

In the method according to the invention, there is provision that at least one first cut occurs in the noncontact region of at least one of the two half-plates, even before the two half-plates are placed onto one another and connected to one another. The term "first cut" is used here to describe all cuts which occur simultaneously or in succession in the noncontact region, but in each case before the two half-plates are placed onto one another and connected.

Particularly in this noncontact region, the half-plates can be only poorly cut after they have been placed onto one another. This is because, in the noncontact region, the two half-plates are spaced apart from one another after they been placed onto one another. The result of this is that the bipolar plate is deformed during mechanical cutting. When laser cutting is used, the focus cannot be simultaneously directed onto both half-plates since these are spaced too far apart from one another. This in turn results in increased burr formation.

(iii) After carrying out the at least one first cut, the two half-plates are placed onto one another and connected. Here, the two half-plates are in particular welded and/or adhesively bonded and/or brazed to one another.

(iv) After they have been placed onto one another, preferably after they have been connected, at least one second cut is carried out. The second cut is made through both half-plates in the contact region. Both a mechanical cutting and a thermal cutting method can be used for the second cut. Since the second cut is carried out in the contact region, the two half-plates here lie directly on one another. There thus occurs no unwanted deformation of the bipolar plate during mechanical cutting. In addition, the region for the focus during laser cutting is relatively highly localized since the half-plates are not spaced apart from one another in the contact region.

In the method according to the invention, it is provided that at least one second cut is carried out in the contact region of the two half-plates and through both half-plates. The term "second cut" is used here to describe all cuts which are carried out simultaneously or in succession in the contact region, in each case after the two half-plates have been placed onto one another and connected.

It is particularly preferably provided that, during the production of the bipolar plate, cutting is exclusively carried out in the contact region after the two half-plates have been placed onto one another and connected.

As has already been described at the outset, the bipolar plates customarily have at least one port. If the plurality of bipolar plates are stacked in order to obtain a fuel cell stack, the corresponding ports are thus aligned and form a duct. The reactants and, where appropriate, cooling media are distributed to the individual bipolar plates via the ducts. The procedure described here, with the first cuts being carried out in the noncontact region and the second cuts being carried out in the contact region, is used in particular to cut out the ports. Thus, it is preferably provided that the contour of a single port is cut by at least one first cut and at least one second cut.

When connecting, in particular welding, the two half-plates, the two half-plates must be pressed against one another. For this purpose, at least one of the half-plates has to be held down on the other half-plate.

When pressing the two half-plates, a corresponding tool is applied at at least one pressing region. It is preferably provided that this pressing region is severed by the second cut. After carrying out the second cut, the pressing region is thus at least partially no longer a constituent part of the bipolar plate, but rather scrap material.

In particular, the at least one pressing region is situated in the at least one port, i.e. in the region which is cut out to form the port. The cuts for cutting the port are thus deliberately made in such a way that, after the at least one first cut, there is still available sufficient material for the pressing region. This procedure allows relatively large leeway when configuring the bipolar plates. In particular, the distances between the ports and the edges around the ports can be made extremely narrow since these regions are no longer necessarily required as pressing regions.

Mechanical cutting is preferably provided for at least one first cut, in particular for all first cuts. Mechanical cutting allows a quick, cost-effective and reliable production. Use is preferably made here of a supporting tool during mechanical cutting. The half-plate lies with full-surface contact on the supporting tool. For this purpose, the supporting tool is shaped so as to correspond to the profiling of the half-plate. This means that the supporting tool has depressions and elevations in correspondence with the profile of the half-plate. It is only in the immediate surroundings of the first cuts that the supporting tool has cutting regions in which the half-plate does not bear. The corresponding cutting tool can penetrate into these cutting regions.

Using the profiled supporting tool avoids unwanted deformation of the profiled half-plate during mechanical cutting.

It is preferably provided that the forming of the sheet metal for producing the profiling of the half-plate and the mechanical cutting for the at least one first cut are carried out in a common tool. Here, these two method steps are carried out in particular simultaneously, for example together in terms of sequence. The tool is in particular a combined pressing and stamping tool. The profiled supporting tool is particularly preferably used here to avoid deformation of the half-plate during mechanical cutting. The profiled supporting tool can at the same time also form the die for the forming and thus for the production of the profiling in the half-plate.

Additionally or alternatively to the mechanical cutting of the at least one first cut, it is preferably provided that at least one first cut is carried out by thermal cutting, preferably laser cutting.

Furthermore, it is preferably provided that at least one second cut is carried out by mechanical cutting. Additionally or alternatively, it is preferably provided that at least one second cut is carried out by thermal cutting, preferably laser cutting.

It is advantageous that the cuttings of the two half-plates can be configured to be different from/independent of one another by the individual first cutting.

The invention further comprises a fuel cell stack having a plurality of stacked bipolar plates. The bipolar plates are produced by the method which has just been described. The advantageous refinements presented within the scope of the method correspondingly find an advantageous application in the fuel cell stack.

The invention further comprises a vehicle having the fuel cell stack. The energy obtained with the fuel cell stack is preferably used for the propulsion of the vehicle.

The invention further comprises a method for cutting a profiled bipolar plate for a fuel cell stack, wherein at least one cut is carried out by mechanical cutting. During the mechanical cutting, the half-plate lies on a shaped supporting tool which corresponds to the profile of the half-plate, with the result that the half-plate is supported with full-surface contact on the supporting tool. Here, the supporting tool can be used independently of the further processing or mounting of the bipolar plate.

Other objects, advantages and novel features of the present invention will become apparent from the following detailed description of one or more preferred embodiments when considered in conjunction with the accompanying drawings.

DETAILED DESCRIPTION OF THE DRAWINGS

A method according to the invention for producing a bipolar plate 1 is described with reference to FIGS. 1 to 4. The figures show the bipolar plate 1 and the method steps in schematically simplified form.

Figure 1:
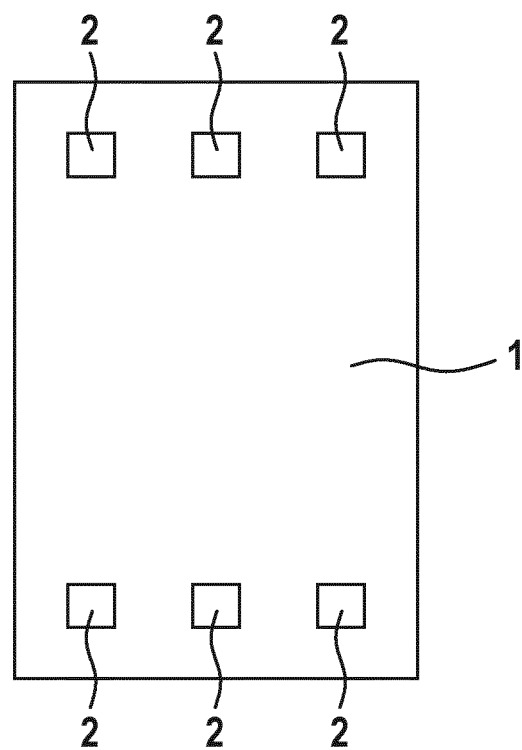
FIG. 1 shows a bipolar plate according to an exemplary embodiment produced by the method according to the invention.

FIG. 1 shows the bipolar plate 1. The bipolar plate 1 has a plurality of ports 2 in the form of cutouts in the upper and lower region. A plurality of the bipolar plates 1 are stacked to produce a fuel cell stack. Here, the individual ports 2 are aligned and thereby form ducts, six of them in the example shown. The ducts in the fuel cell stack are used for distributing the reactants and, where appropriate, cooling media to the individual bipolar plates 1.

Figure 2:
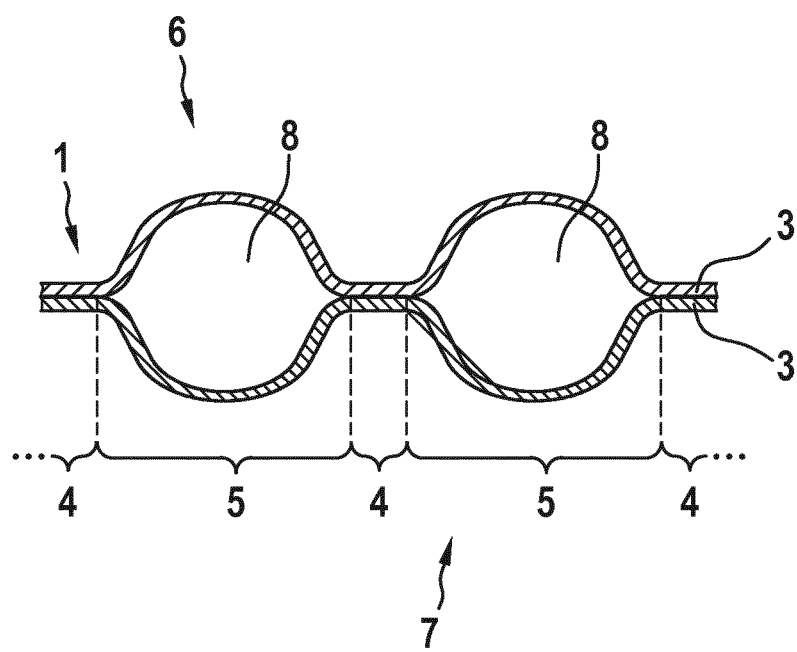
FIG. 2 shows a sectional view of FIG. 1.

FIG. 2 shows a detail section through the bipolar plate 1. The bipolar plate 1 is composed of two half-plates 3. To produce the bipolar plate 1, the two half-plates 3 are, where appropriate, connected to one another, in particular welded.

The individual half-plates 3 are made of sheet metal and profiled. This profiling of the half-plates 3 is produced by forming the sheet metal. The two outer sides of the bipolar plate 1 form the anode side 6 and cathode side 7. Here, the profiling is used to channel and distribute the reactants.

The two half-plates 3 are profiled and placed over one another in such a way that contact regions 4 and noncontact regions 5 result. In the noncontact region 5, a cavity 8 remains between the two half-plates 3. Such a cavity 8 can remain unused or can be used for channeling media in the bipolar plate.

FIG. 2 in particular shows the profile of the bipolar plate 1 in greatly enlarged and simplified form. In fact, the profiling of the half-plates 3 can be designed to be very fine and complex. The individual port 2 for example can extend over a plurality of the contact regions 4 and noncontact regions 5.

As has already been described, the individual half-plates 3 are cut in the noncontact region 5 even before they have been placed onto one another and/or connected. These cuts are referred to as first cuts 11. After the two half-plates 3 have been connected, the half-plates 3 or the bipolar plate 1 are or is cut in the contact region 4. These cuts are referred to as second cuts 12.

It is preferably provided that, after the two half-plates 3 have been connected, exclusively second cuts 12, that is to say cuts in the contact region 4, are carried out at least to cut out the ports 2. This makes it possible to avoid deformation of the bipolar plate 1 and/or an extreme burr formation.

Figure 3:
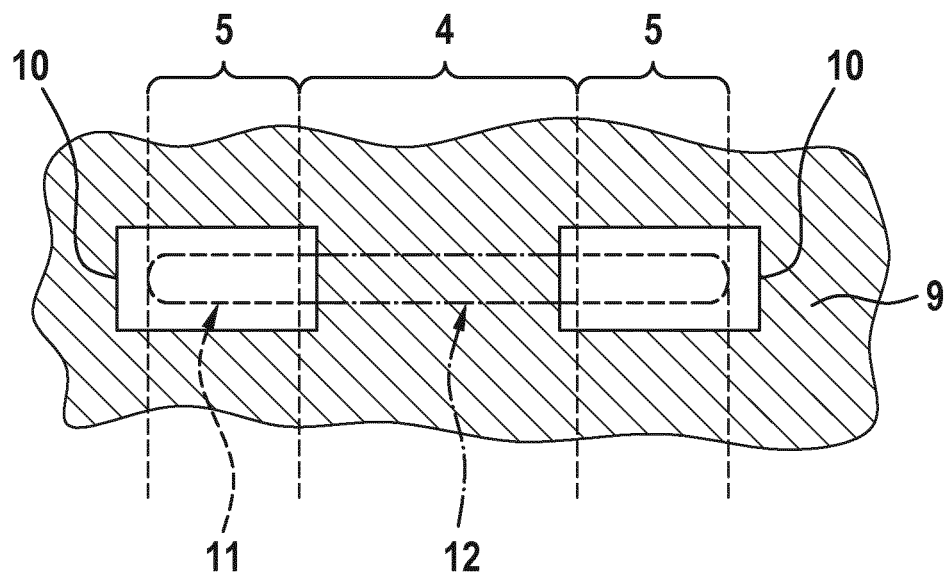
FIGS. 3 and 4 show schematic illustrations for mechanical cutting by the method according to the invention.
Figure 4:
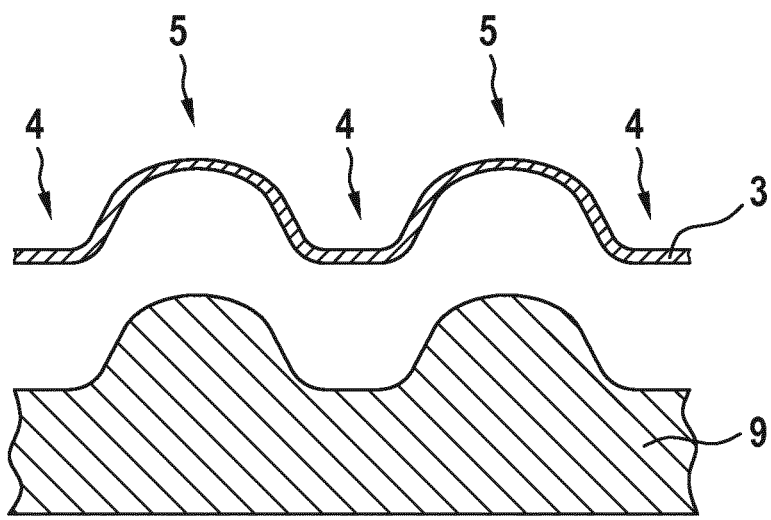

FIGS. 3 and 4 show how a mechanical cutting of the first cuts 11 can be carried out on a profiled half-plate 3. For this purpose, a profiled supporting tool 9 is used. The supporting tool 9 corresponds in its shape to the profiling of the half-plate 3. As a result, the half-plate 3 can bear with full-surface contact on the supporting tool 9.

FIG. 3 shows a schematic plan view. Dashed lines are used to represent the full-surface bearing of the half-plate 3 on the supporting tool 9. It is only directly around the first cut 11 that there is situated a cutting region 10 in which the half-plate 3 does not bear with full-surface contact. Here, there is preferably provision that the half-plate 3 bears fully peripherally around the cutting region 10 with full-surface contact on the supporting tool 9. This makes it possible to substantially avoid unwanted deformations when carrying out the first cut 11.

The second cut 12 illustrated in FIG. 3, for example by means of mechanical cutting or thermal cutting, is carried out only after the two half-plates 3 have been placed onto one another and connected.

As the schematic sectional illustration in FIG. 4 shows, the cutting region 10 and the first cut 11 are situated in a noncontact region 5 of the half-plate 3. After the two half-plates 3 have been assembled, such a supporting tool 9 can no longer be used for making the first cut 11 since the cavity 8 is no longer accessible in this state.

It is also possible to carry out the first cut 11 or the first cuts 11 only on one of the two half-plates 3.

A profiled supporting tool 9 can also be used for the second cut 12, for example if the first cut 11 is carried out only on one of the two half-plates 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

1 Bipolar plate
2 Ports
3 Half-plates
4 Contact region
5 Noncontact region
6 Anode side
7 Cathode side
8 Cavities
9 Supporting tool
10 Cutting region
11 First cut
12 Second cut

What is claimed is:

1. A method for producing a bipolar plate for a fuel cell stack, the method comprising the steps of:
 (i) providing two half-plates made of sheet metal which result in the bipolar plate when placed over one another, wherein the two half-plates are profiled by forming the sheet metal, and
 wherein, by virtue of the profiling, the two half-plates placed over one another come into contact at at least one contact region and do not come into contact at at least one noncontact region;
 (ii) carrying out at least one first cut in the noncontact region of at least one half-plate before the half-plates are placed onto one another and connected;
 (iii) placing the two half-plates onto one another and connecting them; and
 (iv) carrying out at least one second cut in the contact region through both half-plates after they have been placed onto one another, wherein the at least one second cut in the contact region cuts out a port disposed through both half-plates;
 wherein step (iv) is carried out after the two half-plates have been connected to each other by welding and/or by adhesive bonding and/or by brazing;
 wherein the two half-plates are pressed onto one another during connection, wherein pressure is applied at at least one pressing region which is at least partially severed by the second cut to form the port.

2. The method as claimed in claim 1, wherein
 at least one first cut is carried out by mechanical cutting, wherein, during the mechanical cutting, the half-plate lies on a shaped supporting tool which corresponds to the profile of the half-plate, with the result that the half-plate is supported with full-surface contact on the supporting tool.

3. The method as claimed in claim 1, wherein
 the forming of the sheet metal for the profiling and a mechanical cutting for the at least one first cut are carried out in a common tool.

4. The method as claimed in claim 3, wherein
 the forming of the sheet metal for the profiling and the mechanical cutting for the at least one first cut are carried out in the common tool simultaneously.

5. The method as claimed in claim 1, wherein
 at least one first cut is carried out by thermal cutting.

6. The method as claimed in claim 5, wherein the thermal cutting is laser cutting.

7. The method as claimed in claim 6, wherein
at least one second cut is carried out by mechanical cutting and/or at least one second cut is carried out by thermal cutting.

8. The method as claimed in claim 1, wherein
at least one second cut is carried out by mechanical cutting and/or at least one second cut is carried out by thermal cutting.

9. A fuel cell stack, comprising a plurality of stacked bipolar plates, produced by the method as claimed in claim 1.

10. A vehicle, comprising a fuel cell stack as claimed in claim 9.

\* \* \* \* \*